June 27, 1933.  P. F. VAUGHN  1,915,962
ELECTRIC COOKER
Filed Sept. 11, 1931  2 Sheets-Sheet 1

INVENTOR
Pirl F. Vaughn
U. G. Charles
ATTORNEY

June 27, 1933.  P. F. VAUGHN  1,915,962
ELECTRIC COOKER
Filed Sept. 11, 1931   2 Sheets-Sheet 2

INVENTOR
Pirl F. Vaughn
ATTORNEY

Patented June 27, 1933

1,915,962

UNITED STATES PATENT OFFICE

PIRL F. VAUGHN, OF SALINA, KANSAS, ASSIGNOR OF ONE-HALF TO CORA W. SHELTON, OF SALINA, KANSAS, AND ONE-EIGHTH TO JENNIE B. PHILLIPS, OF WICHITA, KANSAS

ELECTRIC COOKER

Application filed September 11, 1931. Serial No. 562,257.

My invention relates to an electric cooker.

The object of my invention is to provide an electric cooker having an upper and lower heating element and a plurality of intermediately distributed heating elements to project within the article being cooked.

A further object of my invention is to provide an adjustment for the intermediate heating elements to automatically recede should any of the elements contact on a non-penetrative portion of the article being cooked.

A still further object of my invention is to provide an electric cooker that will inclose the article being cooked and introduce heat to the external and intermediate portions simultaneously as a rapid process for cooking articles.

These and other objects will hereinafter be more fully explained, references being had to the accompanying drawings forming a part of this specification, and in which like characters will apply to like parts in the different views, and in which.

Figure 1:
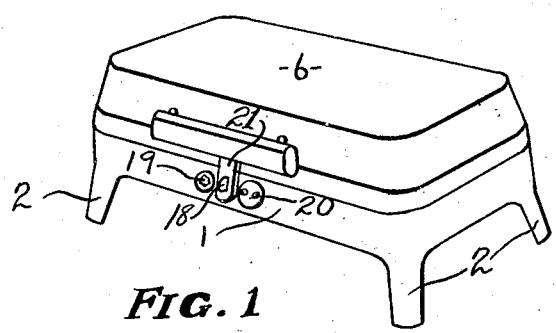
Fig. 1 is a perspective view of the cooker having the lid portion closed.
Figure 2:
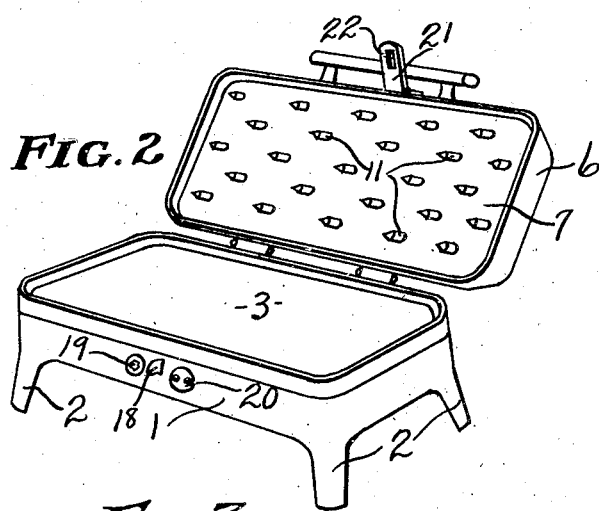
Fig. 2 is a perspective view of the cooker showing the lid portion opened.
Figures 3, 4:
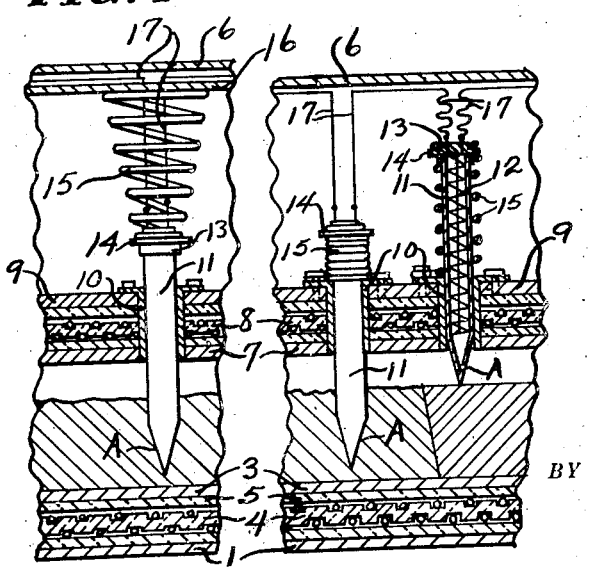
Fig. 3 is an enlarged fragmentary sectional detail view of the penetrative elements illustrating an adjusting feature.
Fig. 4 is a modification of the spring actuating means for the penetrative elements.

My invention herein disclosed consists of a cooker comprising a body portion 1 supported by legs 2 and having positioned therein a plate 3 on which articles are placed to be cooked, the said plate resting on a heating coil 4 and being insulated therefrom by a thin sheet 5, as shown in Figs. 3 and 4. The said heating coil is also insulated from the bottom of the body portion to the extent to prevent shorting of the circuit and excessive heating of the same.

Positioned in the lid 6 and carried thereby is a plate 7 arranged to contact with or positioned in close proximity to an article being cooked, and having positioned thereon an electric heating coil 8 and being insulated therefrom sufficient to avoid shorting of the circuit, and a second plate 9 positioned on the top of the coil and insulated in like manner for the purpose previously mentioned, but to a greater extent to avoid excess heating of the plate.

Figure 5:
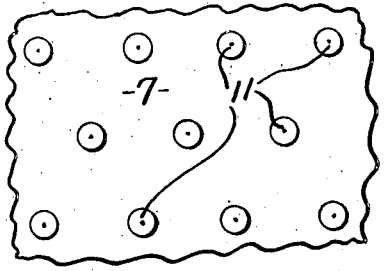
Fig. 5 is a fragmentary plan view of the penetrative elements carried by the lid.

The latter described plates and heating coils have a plurality of perforations therethru and in registry for the reception of sleeves 10 thru which heating elements 11 will engage with a smooth sliding fit, the said elements being pointed as at A as means to penetrate meat, pastry, or the like, each of the penetrative elements are bored axially to receive a heating coil 12 and secured therein by a cap 13, the said member having a flange 14 against which a tension spring 15 will engage functioning as a flexible support for said elements extending downward so that the point of each is in close proximity to the heating plate 3. It being understood that the tension of the springs are sufficient to cause said elements to penetrate thru meat or pastry cooking the same intermediate of the bulk and in close proximity to each other and staggered as shown in Fig. 5.

In the event of cooking steak having bones therein, it is shown in Fig. 3 the position of the penetrative element in contact therewith forcing the same upward independent of the others, by which means the lid of the cooker may be closed without interruption.

Figure 7:
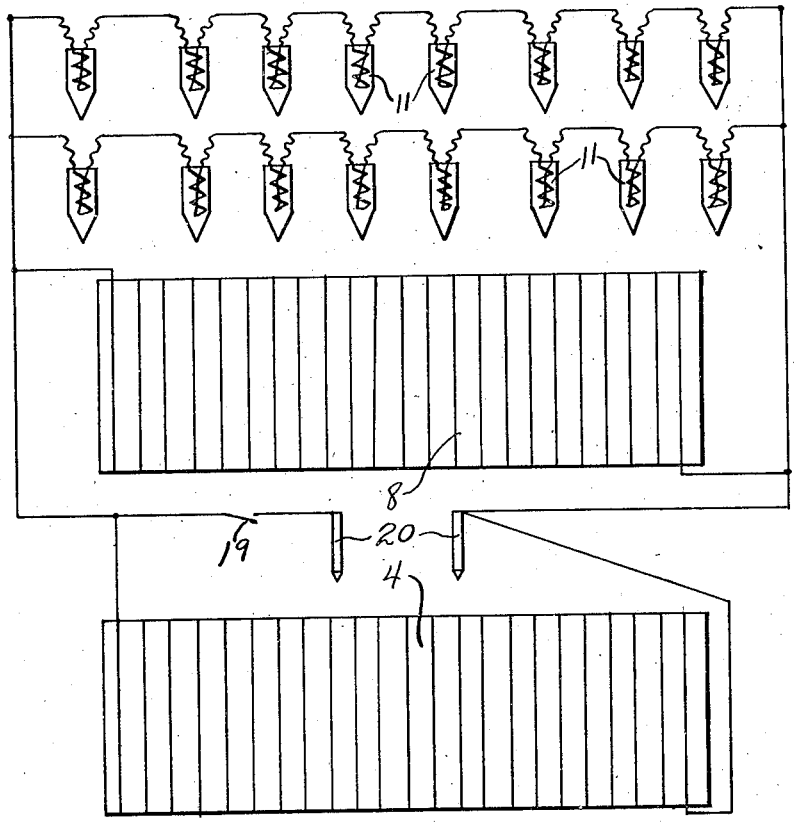
Fig. 7 is a wiring diagram.
Figure 6:
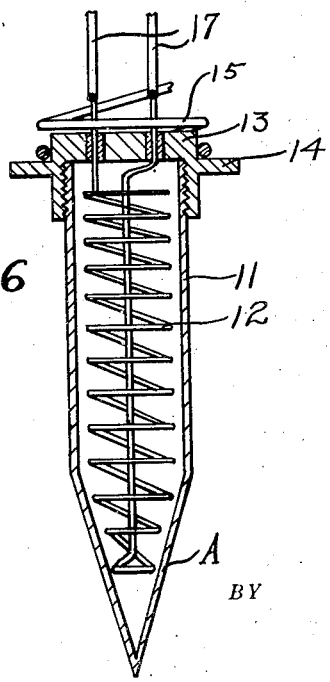
Fig. 6 is an enlarged detail view of one of the penetrative cooking elements.

It will be understood that the said tubular penetrative cooking elements will be wired in series by placing the wires in the upper portion of the lid with a downward loop to their respective penetrative cookers and being of sufficient length to yield for the full extent of the longitudinal movement thereof when such movement is imposed, and the said upper and lower cooking plates are hooked up in the same circuit for simultaneous distribution of the heat energized by the current as shown in the wiring diagram in Fig. 7 providing a switch and a plug to make and break the current.

In Fig. 3 is shown a spring 15 wound on the shaft of the penetrative element as downward tensioning means therefor while in Fig. 4 is shown a modification by the employment of a helical spring, one end of which is positioned on the cap of the penetrative cooker while the other end which is greater in diameter is seated on a plate 16 positioned in the lid preferably covering the entire area thereof functioning as a support for the wiring 17 positioned between said plate and top of the lid. The plate 16 being apertured in axial alignment with the penetrative cookers and thru which the loops project and free to flex within the helical spring as the same is actuated by longitudinal movement.

The purpose of employing the helical spring is to provide a container for the loops of wiring and to avoid tilting or buckling of the spring, and furthermore to avoid rapid annealing of the same.

As a means to secure the lid in a closed position should one or more of the spring elements be under compression as previously described, I have arranged a catch 18 secured to the body portion between switch 19 and plug 20, and rockably arranged on the lid is a hasp 21 having an elongated slot 22 in which the catch will engage as the lid is pressed downward, and such modifications may be employed as lie within the scope of the appended claim, and having fully described my invention what I claim as new and desire to secure by Letters Patent is:—

In an electric cooker of the class described comprising a body portion having a pair of plates snugly fitting therein, and a heating element placed between the plates, and a lid hinged to the body portion, the lid having a pair of plates positioned therein, and a heating element between the plates, the last said plates being perforated and having a sleeve snugly fitting in each perforation, a hollow pointed heating element having a heating coil placed in the hollow thereof, a helical spring secured to the blunt end thereof as flexible means to permit the sliding movement of the heating elements thru their respective sleeves, and to normally extend the same outward, the heating coils of the plates and heating elements being wired to function simultaneously.

In testimony whereof I affix my signature.

PIRL F. VAUGHN.